United States Patent

Castleman

(10) Patent No.: US 10,252,155 B2
(45) Date of Patent: Apr. 9, 2019

(54) BRUSHLESS TWO DIMENSIONAL HAPTIC ACTUATOR

(71) Applicant: Sony Interactive Entertainment Inc., Tokyo (JP)

(72) Inventor: Dennis Castleman, San Mateo, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 77 days.

(21) Appl. No.: 15/243,592

(22) Filed: Aug. 22, 2016

(65) Prior Publication Data

US 2018/0050270 A1    Feb. 22, 2018

(51) Int. Cl.

| | |
|---|---|
| A63F 13/285 | (2014.01) |
| H02K 33/02 | (2006.01) |
| A63F 13/33 | (2014.01) |
| A63F 13/335 | (2014.01) |
| H02K 1/14 | (2006.01) |
| H02K 1/27 | (2006.01) |
| H02K 1/34 | (2006.01) |
| H02K 7/12 | (2006.01) |
| A63F 13/327 | (2014.01) |

(52) U.S. Cl.
CPC .......... *A63F 13/285* (2014.09); *A63F 13/327* (2014.09); *A63F 13/33* (2014.09); *A63F 13/335* (2014.09); *H02K 1/146* (2013.01); *H02K 1/2706* (2013.01); *H02K 1/34* (2013.01); *H02K 7/125* (2013.01); *H02K 33/02* (2013.01); *A63F 2300/8082* (2013.01)

(58) Field of Classification Search
CPC .................................................. A33F 13/285
USPC ...................................................... 340/407.2
See application file for complete search history.

(56) References Cited

U.S. PATENT DOCUMENTS

| | | | |
|---|---|---|---|
| 6,283,859 B1 | 9/2001 | Carlson et al. | |
| 6,693,622 B1 | 2/2004 | Shahoian et al. | |
| 6,982,696 B1 | 1/2006 | Shahoian | |
| 9,802,225 B2* | 10/2017 | Houston | B06B 1/16 |
| 2002/0030663 A1 | 3/2002 | Tierling et al. | |
| 2008/0094058 A1 | 4/2008 | Kawashima et al. | |
| 2011/0006618 A1 | 1/2011 | Lee et al. | |
| 2014/0066122 A1* | 3/2014 | Shukla | H02K 41/0356 455/556.1 |
| 2014/0232211 A1* | 8/2014 | Katada | H02K 33/00 310/25 |
| 2015/0081110 A1* | 3/2015 | Houston | G05D 19/02 700/280 |
| 2016/0144404 A1* | 5/2016 | Houston | B06B 1/166 318/114 |
| 2016/0258758 A1* | 9/2016 | Houston | G01C 21/20 |
| 2016/0361637 A1* | 12/2016 | Higgins | A63F 13/24 |
| 2017/0182517 A9* | 6/2017 | Houston | B06B 1/166 |
| 2017/0206755 A1* | 7/2017 | Levesque | G08B 6/00 |

* cited by examiner

*Primary Examiner* — Santiago Garcia
(74) *Attorney, Agent, or Firm* — John L. Rogitz

(57) ABSTRACT

An eccentric magnet rotates around a spool under the influence of an electric field generated by a rotational coil surrounding the magnet to produce haptic output by rotational vibration. The ends of the spool are connected to springs, and linear actuating coils are disposed near the respective ends of the spool to cause the spool and, hence, the magnet rotating around it, to reciprocate, generating additional haptic output from the vibrations of the reciprocating motion.

7 Claims, 4 Drawing Sheets

BRUSHLESS TWO DIMENSIONAL HAPTIC ACTUATOR

FIELD

The application relates generally to brushless two dimensional haptic actuators.

BACKGROUND

The use of haptic feedback to provide virtual reality (VR) experiences particularly in computer gaming is increasing. As understood herein, as computer games grow more sophisticated, haptic feedback in multiple dimensions may be desirable.

SUMMARY

Accordingly, a device includes a magnet, a rotational coil around the magnet and energizable to induce rotation of the magnet, and at least a first linear actuation coil disposed adjacent a first end of the magnet to induce linear motion of the magnet.

In some embodiments the magnet is eccentric to induce vibration as it rotates.

In some embodiments the device includes a spool inside the magnet. A first spring can be disposed against a first end of the spool to urge the spool to move linearly. The first linear action coil may be disposed adjacent the first spring. Also, a second spring can be disposed against a second end of the spool to urge the spool to move linearly, and a second linear actuation coil can be disposed adjacent the second spring.

The device may include structure coupling the magnet to the spool such that the magnet moves linearly with the spool. The structure can include a circumferential groove, e.g., in the magnet, engaged with a circumferential collar, e.g., in the spool.

In another aspect, a circuit includes at least one coil arranged to move a magnet when the coil is energized to produce haptic output. The coil includes first and second terminals. At least one microcontroller controls energization of the coil. The microcontroller has at least first and second outputs. A first power supply is connected to the first output of the microcontroller and is also connected to the first terminal of the coil. The first power supply can be energized according to signals received from the first output of the microcontroller. Also, a second power supply is connected to the second output of the microcontroller and to the second terminal of the coil. The second power supply can be energized according to signals received from the second output of the microcontroller.

In another aspect, a haptic signal generator (HSG) includes at least one magnet disposed around at least one spool for rotation about the spool. The magnet is mechanically coupled to the spool such that the magnet moves linearly during rotation as the spool moves linearly. At least one rotational coil is arranged to induce rotation of the magnet around the spool, and at least a first linear actuation coil is arranged to induce linear motion of the magnet as the magnet rotates.

The details of the present application, both as to its structure and operation, can best be understood in reference to the accompanying drawings, in which like reference numerals refer to like parts, and in which:

DETAILED DESCRIPTION

Figure 1:
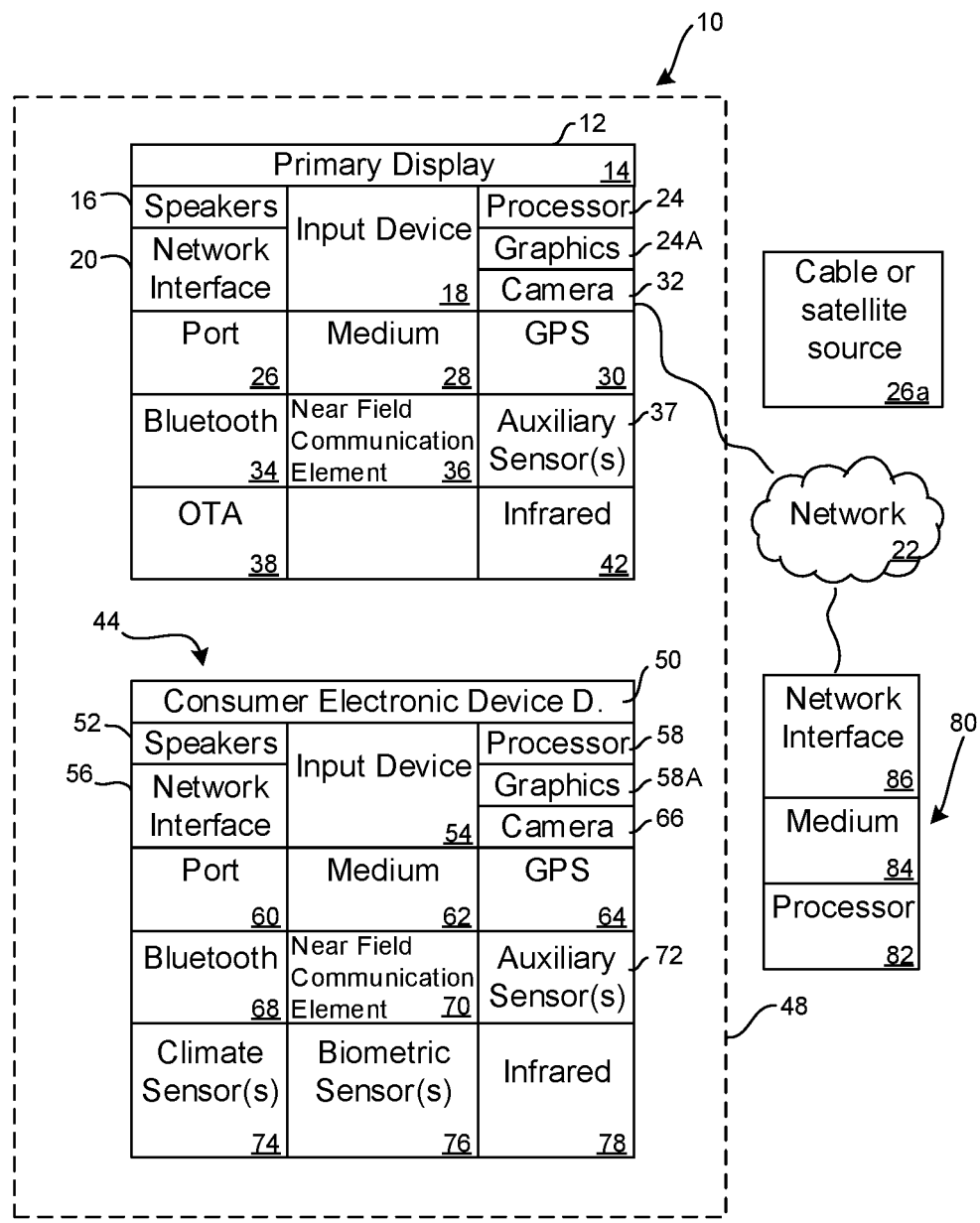
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, one or more of which may be associated with a haptic signal generator such as disclosed herein and which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be any conventional general purpose single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or gaming computer (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a VR headset, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), a pressure sensor, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Figure 2:
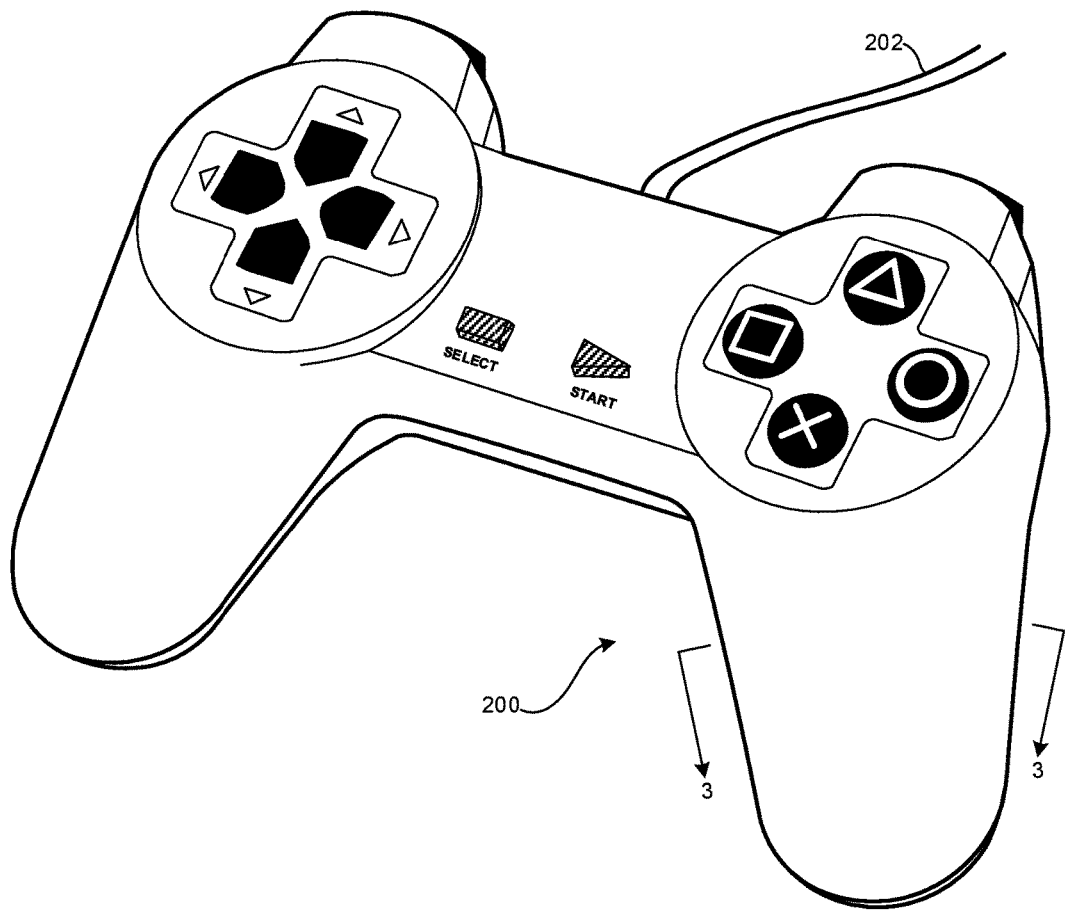
FIG. 2 is a perspective view of a game controller used as but one example of a component that may employ a haptic generator.
Figure 3:
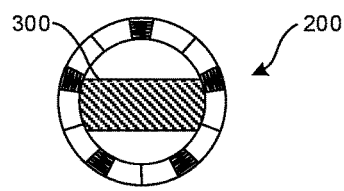
FIG. 3 is a cross-sectional view as taken along the line 3-3 in FIG. 2.

FIGS. 2 and 3 show a game controller 200 that may incorporate appropriate components of the second CE device 46 described above, as amplified below. The controller 200 may be a PlayStation® game controller or an XBox® game controller or other game controller that is connected via a wire 202 or wirelessly to a game console that may implement appropriate components from the first CE device 44 described, for example.

FIG. 3 best shows that one or more haptic feedback generators 300 may be mounted on the game controller 200. The haptic feedback generator may be implemented by the haptic generator disclosed further below. The haptic generator may be used with any of the computer devices discussed herein.

While FIGS. 2 and 3 show a game controller as an example of a component that may incorporate the haptic generator disclosed herein, it is to be understood that game controllers are but one example, and that the haptic generator disclosed herein may be incorporated into any of the components discussed herein including, for example, computer game console components such as simulated steering wheels, simulated vehicle seats and other simulated vehicle components, as well as wearable technology mentioned above, such as wristwatches, etc.

Figure 4:
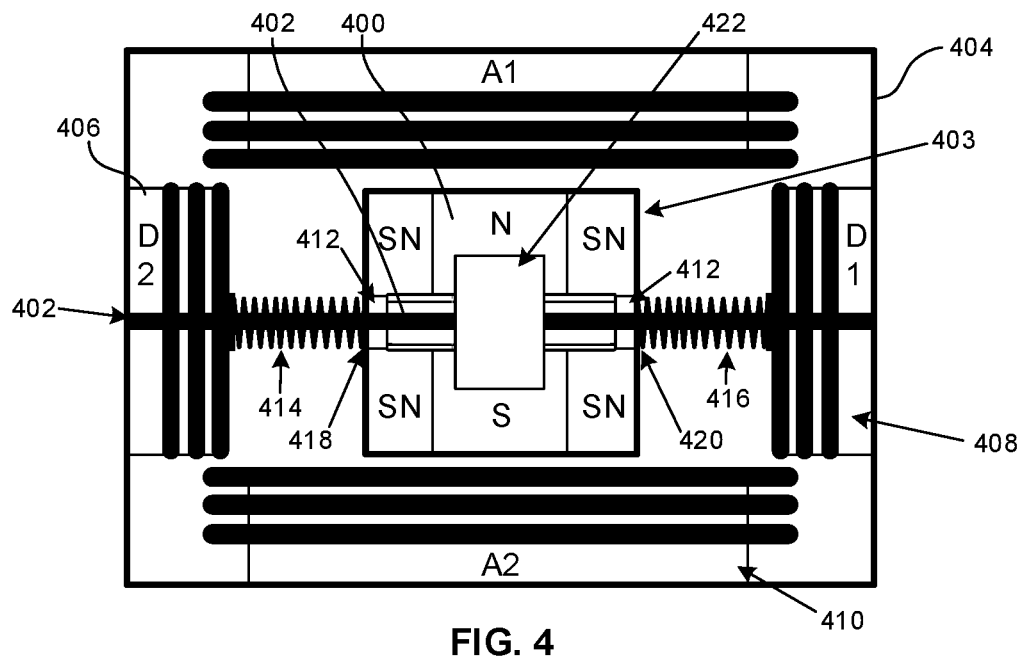
FIG. 4 is a side view of a first embodiment of the haptic generator in which the magnet rotates and thrust bushings are used to engage the springs with the spool.
Figure 5:
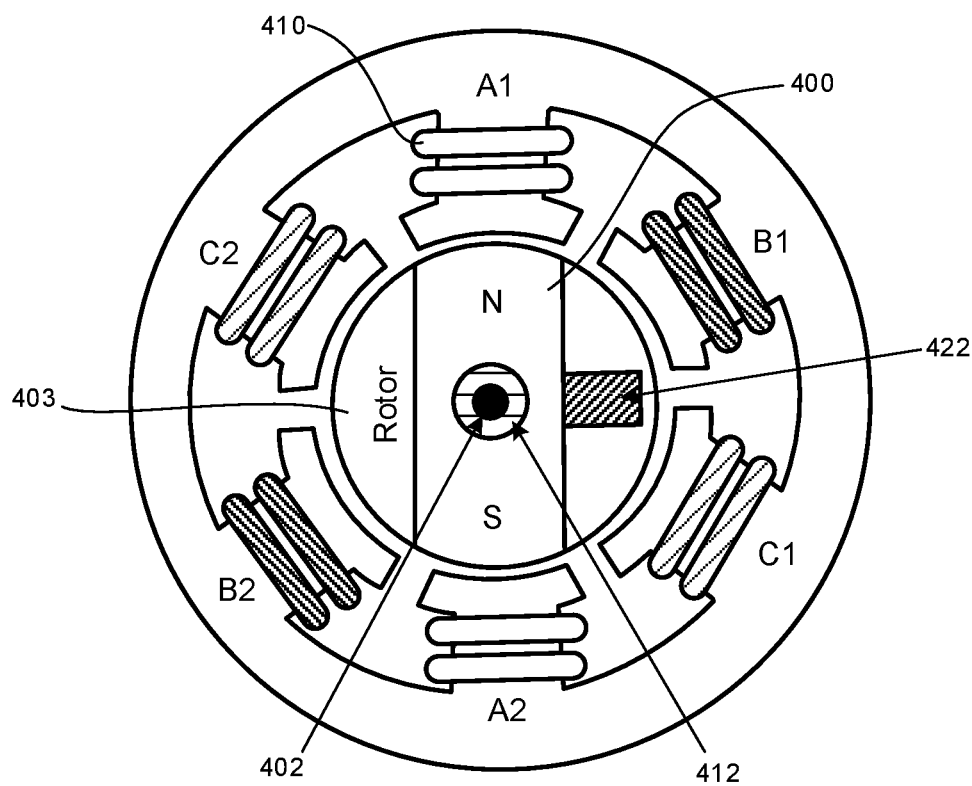
FIG. 5 is transverse view of the actuator shown in FIG. 4.

FIGS. 4 and 5 show an embodiment of the haptic signal generator in which a magnet 400, such as a rare earth magnet, rotates with a rotatable shaft 402, also referred to herein as a "spool". In the example shown, the magnet 400 can be sandwiched between opposed magnetized portions 403 of a rotor that coupled with the rotational coils described below to cause the magnet to rotate with the rotor.

The components of FIGS. 4 and 5 may be contained in a hollow lightweight plastic or metal housing 404. Left and right linear actuating coils 406, 408 may be disposed within the housing 404. The coils 406, 408 are field coils that may alternatingly be energized through their terminals "T" using, for instance, the example circuit in FIG. 6 described below.

As shown in cross-reference to FIGS. 4 and 5, within the housing 404, in addition to the linear actuating coils, are one or more hollow rotational coils 410, each being established a pole pair. As shown in FIG. 5, three such coils may be used. In FIGS. 4 and 5, this three coil, six "pole" arrangement is indicated by labeling a first coil "A1" and "A2", denoting its two poles, labeling a second coil "B1" and "B2", and labeling the third coil "C1" and "C2".

While the coils 710 are referred to as "rotational", it is to be understood that the coils 710 do not rotate, but rather are energized sequentially by direct current (DC) pulses to create a rotating magnetic field that permeates the magnet 400, causing it to rotate. As will be discussed further below, the rotational coils 710 are energized sequentially to cause the magnet to rotate to produce haptic feedback from eccentric rotational motion.

In the example shown in FIGS. 4 and 5, one or more slide bearings 412, which may also be referred to as radial bearings, are disposed between the motor shaft 402 and rotor 403 as shown. In the example of FIG. 4, left and right slide bearings 412 are used on left and right sides of the magnet for the respective portions of the rotor 403 that are supported by the slide bearings.

As best shown in FIG. 4, the shaft 402 extends laterally beyond the rotor 403 and slide bearings 412 and may extend through the linear actuation coils 406 to be supported on the housing 404. Left and right coil springs 414, 416 are disposed around the shaft 402 between the respective linear actuation coils 406 and left and right portions of the rotor 403, and may contact respective left and right thrust bushings 418, 420 on the rotor 403 as shown. With this arrangement, the springs 414, 416 push against the thrust bushings 418, 420 to respectively urge the rotor 403 right and left (looking down on FIG. 4). Consequently, as the left and right linear actuation coils 406 are sequentially energized one at a time by, e.g., pulsed DC current, the cooperation between the springs 414, 416 and alternating magnetic fields created by the linear actuation coils 406 causes the rotor 403 and, hence, magnet 400 to reciprocate linearly (left and right, looking down on FIG. 4). In this way, haptic feedback of the type produced by a linear response motor (LRM) is generated.

As mentioned above, in addition to LRM-type haptic feedback, the haptic feedback generator discussed herein also produces haptic feedback of the type caused by eccentric rotational motion. To this end, as shown in FIGS. 4 and 5, a mass 422 may be coupled to the magnet 400 in such a way as to render the magnet assembly asymmetrical or eccentric about its axis. This is best illustrated in FIG. 5, in which the mass 422 is shown to be coupled to one side of the magnet 400. The mass 422 may be an Iron mass or magnetic mass that remains magnetically coupled to the magnet 400 and/or it may be a mass that is adhesively bonded or soldered or welded or otherwise engaged with the magnet 400.

Figure 6:
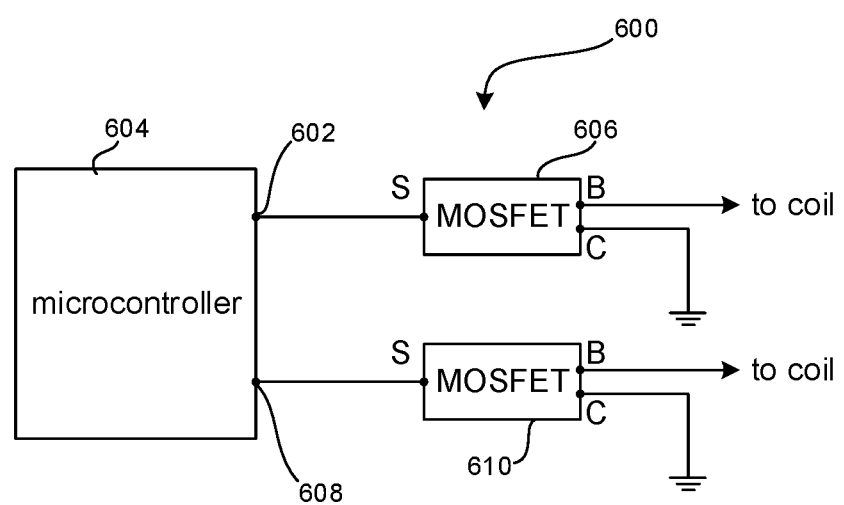
FIG. 6 is an electrical diagram of an example coil activation circuit.

FIG. 6 illustrates a drive circuit 600 that may be connected to the terminals of any of the coils described herein to energize the coils. A first general purpose input output (GPIO) pin 602 of a microcontroller 604 may be connected to a first power supply 606 to control actuation of the power supply. The microcontroller 604 may be implemented by any of the processors/controllers described herein.

In the example shown, non-limiting the power supply 606 is a metal oxide semiconductor field effect transistor (MOSFET) and its source "S" is connected to the microcontroller 604, with its base "B" connected to a first terminal of a coil and its collector "C" connected to ground. Similarly, a second GPIO pin 608 of the microcontroller 604 may be connected to a second power supply 610 to control actuation of the power supply. In the example shown, non-limiting the power supply 610 is a MOSFET and its source "S" is connected to the microcontroller 604, with its base "B" connected to a second terminal of the coil whose first terminal is connected to the first MOSFET 606 its collector "C" connected to ground.

When three rotational coils 410 are employed, in effect three pulsed poles are established to create a rotating field around the magnet 400, causing the magnet to rotate. Non-energized poles may be monitored for voltage and used as an indication by the microcontroller when to pulse another coil for either linear actuation or rotational actuation of haptic feedback.

In some embodiments, only one spring may be used, with one or both of the illustrated linear actuation coils. In some implementations, only one linear actuation coil may be used, with one or both of the illustrated springs. In some embodiments a single spring may be disposed on the same end of the spool as a single linear actuation coil. In other embodiments a single spring may be disposed on the opposite end of the spool from a single linear actuation coil.

It will be appreciated that whilst present principals have been described with reference to some example embodiments, these are not intended to be limiting, and that various alternative arrangements may be used to implement the subject matter claimed herein.

What is claimed is:

1. A device, comprising:
   at least one magnet;
   at least one rotational coil around the magnet and energizable to induce rotation of the magnet;
   at least a first linear actuation coil disposed adjacent a first end of the magnet to induce linear on of the magnet;
   at least one spool coupled to the magnet;
   at least a first spring disposed against a first end of the spool to urge the spool to move linearly; and
   at least a second spring disposed against a second end of the spool to urge the spool to move linearly.

2. The device of claim 1, wherein the magnet is eccentric to induce vibration as it rotates.

3. The device of claim 1, wherein the spool is located on a rotational axis of the magnet within the magnet.

4. The device of claim 1, wherein the first linear actuation coil is disposed adjacent the first spring.

5. The device of claim 1, comprising a second linear actuation coil disposed adjacent the second spring.

6. The device of claim 3, comprising structure coupling the magnet to the spool such that the magnet moves linearly with the spool.

7. The device of claim 6, wherein the structure includes a circumferential groove engaged with a circumferential collar.

\* \* \* \* \*